Figure 1:
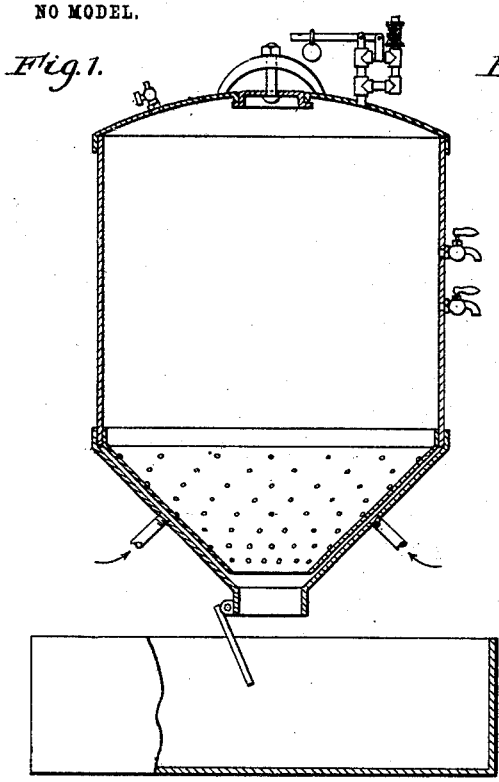

No. 732,151. PATENTED JUNE 30, 1903.
W. B. ALLBRIGHT.
PROCESS OF RENDERING LARD.
APPLICATION FILED JUNE 27, 1902.
NO MODEL.

Witnesses
Wm. Geiger

Inventor:
William B. Allbright
By Munday, Evarts & Adcock
Attorneys

No. 732,151. Patented June 30, 1903.

UNITED STATES PATENT OFFICE.

WILLIAM B. ALLBRIGHT, OF CHICAGO, ILLINOIS.

PROCESS OF RENDERING LARD.

SPECIFICATION forming part of Letters Patent No. 732,151, dated June 30, 1903.

Application filed June 27, 1902. Serial No. 113,388. (No specimens.)

*To all whom it may concern:*

Be it known that I, WILLIAM B. ALLBRIGHT, a citizen of the United States, residing in Chicago, in the county of Cook and State of Illinois, have invented a new and useful Improvement in Processes of Rendering Lard, of which the following is a specification.

This invention relates to an improvement in the art or process of rendering hog-fat into lard in large quantities. In those factories adjacent to or in connection with large killing establishments and where large quantities of hog-fat are made into lard it has become customary as a matter of economy to render the hog-fat into lard by what I will call the "old steam process." This process consists, generally stated, in placing the hog-fat in a closed rendering-tank and subjecting it to the action of live steam blown therein at a pressure in the tank of approximately forty pounds to the square inch until the fat is all liquefied and floats to the top of the mass, after which the supernatent fat is drawn off and the solid and liquid refuse is discharged and saved for use as fertilizer. The liquid refuse, largely water or condensed steam, will contain many of the soluble salts and substances valuable for fertilizing purposes and is evaporated to a residue known as "stick," a quasi glue, which is, however, deliquescent and which is rendered useful as a fertilizer by being heated with an earthy salt—as, for example, sulfate of iron—which produces a valuable dry fertilizer. The solid portion of the refuse is converted into fertilizer by simply drying and grinding the same. The disadvantage of this old steam process arises from the circumstance that the whole of the lard product (which product is the principal purpose of the process) is inferior in color, odor, and flavor to the best kind of lard—*i. e.*, to what is known as "open-kettle-rendered" lard. The color of this old-steam-process lard is not white, as it ought to be, but tinged faintly with green or yellow or greenish yellow. On account of this color it has been generally customary to put the product through what is called a "refining" process to make what is known as "refined" lard, and which consists simply in subjecting the lard to a bleaching process, which consists in heating the lard to about 200° Fahrenheit and agitating it thoroughly in the presence of from one to three per cent. of fullers' earth and thereafter passing it through a filter to remove the fullers' earth; but this bleaching or removal of color always results in developing or disclosing a flavor or smell like the smell of a pig-pen, which is more or less pronounced, according as more or less of certain fats of the animal have been used in the manufacture of the lard, and this flavor is known as the "hog odor," and until the present invention no way has been known of eradicating this pig-pen smell from the lard.

The present invention consists, generally speaking, in separating the fat of the hog into two or more parts or grades before treating it and in rendering in an open kettle by dry heat, the prime grade consisting of what is known as "cutting" lard, comprising pure clean fat—such, for example, as leaf-lard, if that is to be rendered at all—or such portions of the animal as consist only of pure clean fat or pure clean fat and the outer skin, and in rendering the other fats of the hog by the old steam process carried through in the usual manner above indicated, including the bleaching and including incidentally also the development of the hog odor, and then mixing the kettle-rendered lard with the other lard so rendered by heating the two together and agitating them, when it will be found that the hog odor has disappeared and the whole product will have the odor, color, and flavor of prime open-kettle-rendered lard.

Figure 2:
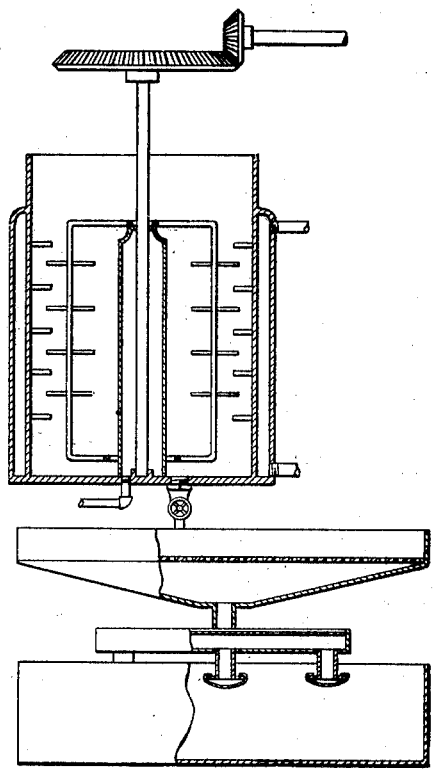
Figure 4:
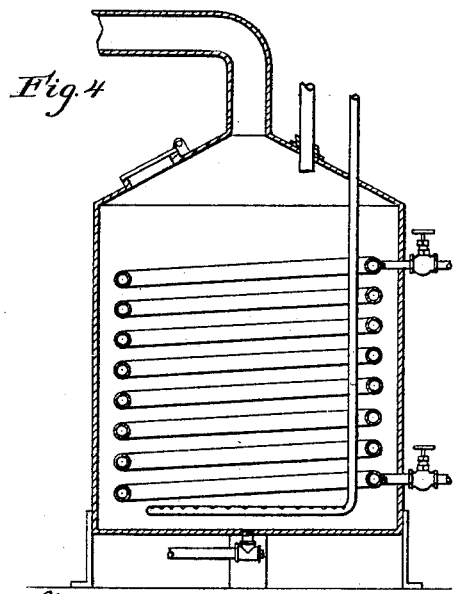
Figure 3:
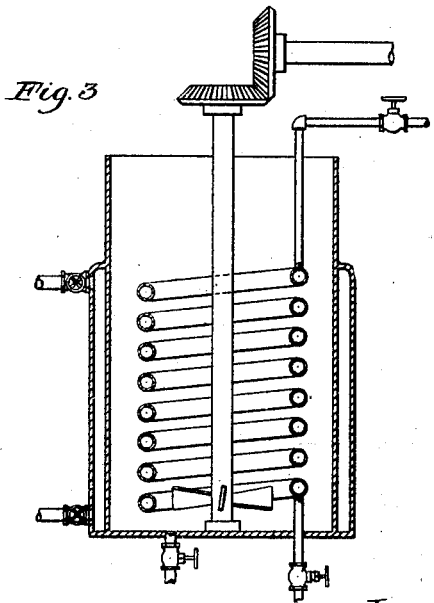

In the accompanying drawings, Figure 1 is a sectional side elevation of a well-known form of closed kettle for steam-rendering lard such as is employed in the old steam process. The steam is admitted at the lower parts of this closed kettle and percolates through a perforated diaphragm into the fat and is condensed. A safety-valve and a governable steam-escape controls the pressure. Cocks at various heights are used to draw off the supernatant liquid fat or lard. Fig. 2 shows a sectional elevation of a common form of open kettle for open-kettle rendering. It is shown as provided with a steam-jacket for heating it and a stirring arrangement for stirring the contents. Fig. 3 shows the usual form of bleaching-kettle. It comprises an open jacketed kettle, most generally provided also with a steam-coil, and has a central stirring-shaft provided with propeller-blades for stirring the contents. Fig. 4 illustrates a common form of deodorizing-kettle. In the instance illustrated the contents are heated by an internal steam-coil, and provision is made by means of a perforated pipe in the bottom for blowing live steam up through the contents, and at the top is a chimney for carrying away the odor.

While I have shown these various forms of kettles in the drawings, the process herein described may be carried on by any form of apparatus of the same or similar general nature.

In practicing my invention I prefer always to divide the hog-fat into three grades—first, all of the prime clean fat or cutting lard, comprising pure fat or pure fat accompanied only by skin and which can be conveniently rendered in an open kettle, (including the leaf-lard if that is to be rendered;) secondly, all such pure fat as cannot be conveniently rendered in an open kettle—such, for example, as involves bones or other parts of the animal—and, thirdly, all those fats which develop the greater part of the hog odor and color and which require for their rendering the presence of the peculiar feature of the old steam process—namely, the washing or dissolving action of the hot steam and the water of its condensation. And I prefer to render and treat each of these three grades separately before mixing, because by so doing a lesser percentage of fullers' earth is required in the bleaching of the second grade than in the bleaching of the third or offensive grade, and this results in an economy both in the quantity of fullers' earth required and also in the quantity of lard or fat absorbed by the fullers' earth and lost as waste, which, it will be remembered by those who are skilled in the art, amounts to about one-fourth of the total weight of the fullers' earth thus used. However, in the smaller establishments where small volume to be treated is involved it may be sometimes more economical to treat the second and third grades as one; but even so, some of the advantages of my invention will be obtained.

For a better understanding my preferred process is as follows: Divide the fats of the hog into three grades, as follows: a prime grade consisting of what is known as "cutting" lard, which consists of all the trimmings of the different parts of the hog which comprise only pure clean fat or pure clean fat and skin and which constitute outside of the leaf-lard of the hog about sixty per cent. of the total fat of the animal that is usually rendered as lard, and to this may be added, if desired, all of the leaf-lard, which is usually, however, employed for other purposes than the manufacture of lard in large factories; a second grade of the fats known as "killing" lard and constituting about thirty per cent. of all the fats generally rendered as lard in the factories of packing-houses and comprising, generally stated, the heads, all bone-fat, caul-fat, ruffle-fat, brisket-fat, ham-facings fat, scrap leaf-fat, and all kindred fats of parts such as cannot be conveniently rendered in an open kettle by reason of the parts of the animal connected therewith, such as bones, &c., and yet which in rendering develop relatively little offensive odor or color, and a third or offensive grade known generically as "gut-lard," constituting about ten per cent. of the fats usually rendered in the factories or packing-houses and comprising, generally stated, black gut-fat, bung-gut-trimming fat, pluck-trimming fat, bladder-trimming fat, gullets-fat, navel-fat, and all those fats which are liable, being of the same or kindred nature, to develop color or offensive odor. Having thus graded the fats into prime, second, and third grades, I proceed to render them as follows: The prime grade I render in an open kettle by dry heat, and the product is a fine prime grade of white lard impregnated with the flavor and odor of the cooked scrap, which is always in this kind of lard extremely pleasant and strongly pronounced, being exactly such as is always found in home-rendered lard made from the best pure leaf and even more pronounced than in such home-rendered lard, because it contains a large proportion of skin scrap which is browned and caramelized in the process of rendering by the dry heat and action of the hot lard. The product of this grade requires no other treatment than simply to be strained clear of the scrap, and the scrap or residue may be tanked either separately for the recovery of the fat it retains or it may be added to the fats of grade No. 2, and for convenience I prefer this latter method of disposing of it. The fats of grade No. 2, including the scrap from the treatment of grade No. 1, if the same has been added, are placed in a closed tank and live steam is admitted until a pressure of about forty pounds to the square inch is obtained, the steam being blown through the fats. This action is maintained until all of the fats are liquefied and separated and the supernatent lard or floating liquid fat is then drawn off and the tankage or refuse discharged. Grade No. 3 is treated in precisely the same way as grade No. 2, but, as before indicated, preferably kept separate therefrom. The lard products of grades 2 and 3 are now put through the bleaching process, preferably separately. This bleaching process may consist of the usual one—that is to say, the lard is first heated to about 200° Fahrenheit and then from one to three per cent. of fullers' earth is added and thoroughly mixed until the fullers' earth comes into intimate contact with every part of the lard, and thereafter the hot lard is passed through the usual filter-press, which removes the fullers' earth and leaves the product white, but, as before indicated, strongly impregnated with the hog odor. To remove as much of this hog odor as possible from the product of grades 2 and 3

I next heat the same to such a degree of heat that the lard will no longer condense live, steam, say, to 220° Fahrenheit or over and then while the lard is hot blow live steam through it until as much of the odor has been driven out as possible. As this is accompanied by the development of very strong odors, especially with respect to the third or offensive grade, it is well to have a chimney connected to the tank in which this deodorizing is carried on to carry away the odors. Finally I mix very thoroughly together the lard products of all three grades—1, 2, and 3—very intimately and thoroughly while in a hot state and completely fluid. This may be done by running the products into a common tank containing suitable stirrer-arms or any other suitable mixing apparatus. The mixed product is now drawn off into the mercantile packages or storage-vats, allowed to cool, when it is ready for the market, or it may be rapidly cooled by the usual method over a roller filled with cold brine and drawn off directly into the packages for shipment to the trade. The difference between these two methods of cooling the lard is only a matter of convenience; but the latter method produces what is known as "smooth" lard as contradistinguished from "grained" lard, which is produced from the former method of cooling. The lard resulting from this mixture will be found to be free from all objectionable color or odor and having the color and odor and every quality of prime open-kettle-rendered lard and acceptable to the market as such, being a perfectly wholesome and entirely inoffensive white product with the pleasant flavor and odor of home-rendered leaf-lard.

In addition to the improved quality of the general product due to my process of rendering the fat of the hog there is an important saving or economy in the treatment of the waste products of the rendering in the manufacture of fertilizer. In what I have termed the "old steam process," the one in general use in these large concerns, where all the fat is rendered by the steam-tank process, the dumpings or refuse from the rendering consisting of the solid and liquid portion or water containing the soluble matters, it will be remembered, are separated from each other by drawing off the water, and the latter is evaporated to recover the matter it contains in solution, which residue is known as "stick." I find by investigation that the water which requires to be evaporated constitutes in the old steam process about forty-five per cent. of the weight of the cutting fat rendered, while I use no water in rendering said cutting fat except to render the small amount of scrap produced by the open-kettle rendering.

I claim—

1. The process of rendering the various fats from all parts of the hog into a common lard product, which consists in separating said fats into grades, rendering the prime grade by dry heat in an open kettle; rendering the inferior fats by live steam in a closed kettle, bleaching said inferior fats and deodorizing them, and mixing the grades in one mass, substantially as specified.

2. The process of rendering the fats from all parts of the hog into a common lard product, which consists in separating the said fats into three grades, a prime grade containing clear clean fats and clear clean fats and skin which may be rendered in an open kettle, a second grade containing clean fats but which require to be rendered in a steam-kettle, and a third grade containing the offensive fats; rendering the first grade in an open kettle, rendering the two other grades separately from each other in a closed kettle by the admission of steam, bleaching said two other grades separately, deodorizing them and finally mixing all three grades together, substantially as specified.

WILLIAM B. ALLBRIGHT.

Witnesses:
H. M. MUNDAY,
JOHN W. MUNDAY.